Figure 1:
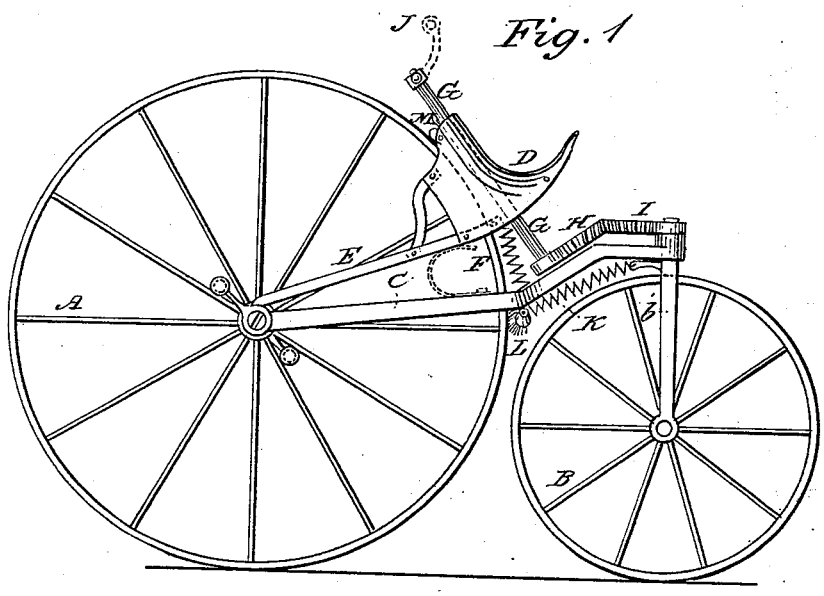
Figure 2:
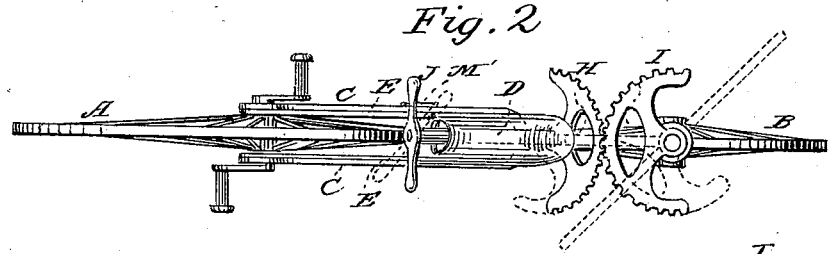

B. H. MUEHLE.
Velocipede.

No. 96,466.

Patented Nov. 2, 1869.

Witnesses:
John V. Stumpf
Henry Gosling.

Inventor:
B. H. Muehle.

United States Patent Office.

BERNARD H. MUEHLE, OF BUFFALO, NEW YORK, ASSIGNOR TO HIMSELF AND NICHOLAS JONES, OF SAME PLACE.

Letters Patent No. 96,466, dated November 2, 1869; antedated October 30, 1869.

IMPROVED VELOCIPEDE.

The Schedule referred to in these Letters Patent and making part of the same.

*To all whom it may concern:*

Be it known that I, BERNARD H. MUEHLE, of the city of Buffalo, county of Erie, and State of New York, (assignor to myself and NICHOLAS JONES, of the same place,) have invented a certain new and improved Velocipede; and I do hereby declare that the following is a full, clear, and exact description thereof, reference being had to the accompanying drawings, making a part of this specification, in which—

Figure I is a side elevation, and
Figure II is a top plan view.

Letters of like name and kind refer to like parts in each of the figures.

In the accompanying drawings, I have represented a two-wheeled velocipede, that is to say, a vehicle supported upon two wheels, one behind the other, and shall so describe the same, though my improvements herein set forth and claimed, may also be applied to three and four-wheeled velocipedes, with equal advantage.

A represents the driving-wheel, the axle of which is provided with a crank upon each end, by means of which the velocipede is propelled by the driver, in the usual manner.

B represents the rear wheel, which I use for steering the vehicle.

C represents the main frame or reach. Its forked ends have bearings upon the axle of the driving-wheel A, and the opposite end has a socket, into which the king-bolt of the frame b' of the steering-wheel B is fitted, and within which the same revolves.

D represents the driver's seat. It is attached to the end of a forked frame, E, which clasps the driving-wheel.

The forked ends of the frame E have bearings upon the axle of the driving-wheel, on each side thereof respectively, like those of the main frame C.

A coil-spring, F, or one or more flat springs, as shown by red dotted lines, Fig. I, is interposed between the main frame C and the seat-frame E.

Upon this spring the seat D rests, but while this relieves any shock created by the unevenness of the road, the seat will always remain the same distance from the axle of the driving-wheel, and oscillate upon such axle as a fulcrum, and concentric with the rim of the wheel A.

This feature of my invention is of great importance, and will be admitted to be so by all velocipedestrians.

As the driver sits upon his seat, and, with his feet upon the crank-pins, revolves the driving-wheel, it is essential that the seat should always be at the same distance from the axle which he is turning with his feet, and the motion of his limbs necessary for the propulsion of the velocipede will then always be the same, rendering the physical labor more easy, his motions more uniform and convenient, and the exercise of great skill comparatively unnecessary.

G represents a shaft, having bearings upon the seat-frame, in front of the seat, and upon the main frame, between the front and rear wheels.

H and I are two bevel segments, gearing with each other.

One of these, H, is attached to the shaft G, and the other to the king-bolt or tiller of the frame b', of the steering-wheel B, as shown.

The upper end of the shaft which projects in front of the seat D is provided with a one or two-armed hand-lever, J, by which means the driver is enabled to turn the shaft within its bearings.

As the shaft is revolved in either direction, the steering-wheel is turned correspondingly, and thereby the direction of the front or driving-wheel changed, as may be desired.

A one-armed lever is shown by red lines in Fig. I, and stands upright, or nearly so, upon the forward end of the shaft, and may, of course, be operated with one hand with great convenience and ease.

The gearing H and I may be made of any convenient and suitable size or radius, and might be located underneath the frame C, if preferred.

The upper or forward bearing of the shaft G, upon the seat-frame, is composed of a ring, and located opposite, or nearly so, to a point in the periphery of the driving-wheel, where a line, drawn parallel to the centre of the shaft G, would strike said periphery, so that, as the seat rises or falls upon the spring F, the shaft shall not bind in its upper bearing.

Instead of one wheel being used for steering the vehicle, two wheels, B, might be attached to one shaft, and connected to the frame b'.

This would insure greater stability, and alleviate the difficulty of keeping the balance, which, in the two-wheeled velocipedes, requires a great amount of skill.

K represents a spring, one end of which is attached to the segment I, or a separate lever or tiller, connected to the frame b', of the steering-wheel B, and the other end to a hook upon the main frame or reach C.

This is for the purpose of retaining the steering-wheel always in line with the other wheel or wheels of the velocipede, without the hand-lever being touched by the driver, and whenever the latter has turned the steering-wheel from such straight line of motion, in order to steer the vehicle, and has guided the driving-wheel before him in the direction he wishes to proceed, all he has to do is to let go of the lever J, and the steering-wheel will of itself return to its former position in line with the other wheel or wheels.

The advantage gained by this device will be easily understood, for it is obvious that if a velocipede can be guided with less manipulation of its parts, the use thereof will be rendered more convenient and pleasant.

L represents a brush, which is attached to the under side of the frame or reach C, and in contact with the rim of the wheel A, for the purpose of removing dirt, dust, and mud from said rim, before it can come in contact with the clothes of the velocipedestrian.

There may be one or more brushes applied in like manner to one or all the wheels of the velocipede, at such points where they may be most effective in preventing the dirt from being thrown upon the clothes of the person riding the velocipede.

M represents a brake, which is applied to the seat-frame E, in front, and within reach of the driver. It is so arranged that it may be made to act instantly or gradually upon the rim of the wheel A, without much trouble on the part of the velocipedestrian.

What I claim as my invention, and desire to secure by Letters Patent, is—

The arrangement of the main frame C, seat-standards, frame E, spring K, and steering-apparatus, seat D, and spring F, substantially as and for the purpose described.

B. H. MUEHLE.

Witnesses:
    JOHN V. STUMPF,
    HENRY GULING.